United States Patent
Hirao

(10) Patent No.: US 11,057,544 B2
(45) Date of Patent: Jul. 6, 2021

(54) IMAGE FORMING APPARATUS

(71) Applicant: CANON KABUSHIKI KAISHA, Tokyo (JP)

(72) Inventor: Toyomi Hirao, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/865,524

(22) Filed: May 4, 2020

(65) Prior Publication Data

US 2020/0366812 A1 Nov. 19, 2020

(30) Foreign Application Priority Data

May 15, 2019 (JP) ................................ 2019-092432

(51) Int. Cl.
*H04N 1/60* (2006.01)

(52) U.S. Cl.
CPC ................................ *H04N 1/6033* (2013.01)

(58) Field of Classification Search
CPC .. H04N 1/6033; H04N 1/6055; H04N 1/6052; H04N 1/6036; H04N 1/6038; H04N 1/6044; H04N 1/6083; H04N 1/6094
See application file for complete search history.

(56) References Cited

U.S. PATENT DOCUMENTS

2007/0285743 A1 12/2007 Hirayama

*Primary Examiner* — Christopher Wait
(74) *Attorney, Agent, or Firm* — Venable LLP

(57) ABSTRACT

An image forming apparatus includes a feeder having a tray and configured to convey a sheet, a reader including a platen, an image forming unit configured to form a test pattern, and a controller. The controller adjusts, based on a result of reading the sheet having the test pattern formed thereon, a quality of an image to be formed by the image forming unit. In a case where a sheet of a first type having the test pattern formed thereon is placed on the tray, the feeder conveys the sheet. In a case where a sheet of a second type having the test pattern formed thereon is placed on the tray, the controller is configured to display a notification representing that the sheet is not to be conveyed by the feeder.

15 Claims, 9 Drawing Sheets

MEDIA UNREADABLE WITH ADF.
PLACE CHART ON PLATEN.

| READING MODE | PLAIN PAPER MODE | 1st CARDBOARD READING MODE | 2nd CARDBOARD READING MODE |
|---|---|---|---|
| CONVEYANCE CONTROL CLOCK | 64MHz | 50MHz | 0Mhz |

FIG. 4

| MEDIA TYPE (ID) | READABLE/ UNREADABLE | ADF READING SPEED |
|---|---|---|
| PLAIN PAPER (0) | READABLE | NORMAL |
| 1st CARDBOARD (1) | READABLE | LOW SPEED |
| 2nd CARDBOARD (2) | UNREADABLE | - |

FIG. 5

| CCD ELEMENTS | 0 | 1 | 2 | 3 | 4 | ... | x-1 | x |

READ CLOCK 

| OUTPUT PIXEL DATA | 0 | 1 | 2 | 3 | 4 | ... | x-1 | x |

TRANSFER ENABLE CLOCK 

HORIZONTAL SYNCHRONIZING SIGNAL 

MOTOR CONTROL SIGNAL 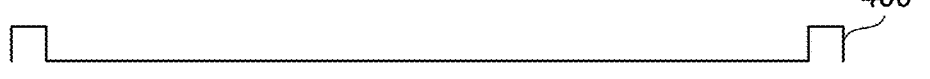

FIG. 6

IMAGE FORMING APPARATUS

BACKGROUND OF THE INVENTION

Field of the Invention

The present disclosure relates to control for adjusting image quality in an image forming apparatus.

Description of the Related Art

A density and a tone of an image to be formed by an electrophotographic image forming apparatus on a sheet vary depending on various factors. For example, a density and an image forming position of an image to be formed by the image forming apparatus change depending on changes in environmental conditions, such as a temperature and a humidity, and a change with time of a component of the image forming apparatus. To address this problem, the image forming apparatus executes calibration for controlling the density of the image to a target density, and calibration for adjusting the image forming position. For example, in the calibration of the image density, a test pattern is formed on a sheet, the test pattern is read by a sensor to obtain an image density, and a parameter for adjusting the image density is corrected so that the image density becomes the target density. It is required that the parameter for adjusting the image density be set appropriately based also on a type (basis weight, coated or uncoated, and recycled or unrecycled) of the sheet. The same can be said for the adjustment of the image forming position. In an image forming apparatus described in United States Patent Application Publication No. 2007/0285743 (A1), in order to read a test chart (sheet having a test pattern printed thereon), an auto document feeder (ADF) is used to convey the test chart. In this manner, workload of a user in performing the calibration is reduced.

In a case where the ADF is used to perform the calibration, an operation in which the user sets the test chart on a tray of the ADF is required. Further, in a case where the ADF is used, it is difficult for a scanner to read the test pattern correctly due to slippage of the sheet and other reasons unless a conveyance speed of the sheet is adjusted depending on a type of the sheet. To address this problem, the image forming apparatus is configured to control a conveyance speed at which the ADF conveys the test chart based on the type of the sheet used for the test chart.

Depending on characteristics (material and surface properties) of the sheet, the scanner may not be able to read the test pattern with the use of the ADF. In this case, the scanner reads a test pattern from a test chart placed on a platen to perform the correction. However, in a case where the user gives an erroneous instruction to read the test chart from the ADF even through the test chart is unreadable with the use of the ADF, the test pattern is not read correctly and the calibration fails. Further, in addition to the failure of the calibration, damage and a breakdown of the ADF may result. In view of such circumstances, the present disclosure has an object to prevent an erroneous instruction from a user for a method of reading a test chart.

SUMMARY OF THE INVENTION

An image forming apparatus according to the present disclosure includes: a feeder including a tray, on which a sheet is to be placed, the feeder being configured to convey the sheet on the tray; a reader including a platen, on which a sheet is to be placed, the reader being configured to read the sheet on the platen, and to read the sheet conveyed by the feeder; an image forming unit configured to form a test pattern; a controller configured to: control the image forming unit to form the test pattern on a sheet; control the reader to read the sheet having the test pattern formed thereon; and adjust, based on a result of reading the sheet having the test pattern formed thereon, a quality of an image to be formed by the image forming unit; and a display configured to display a screen for making a notification representing that the sheet is not to be conveyed by the feeder, wherein the controller allows, in a case where a sheet of a first type having the test pattern formed thereon is placed on the platen, a first reading process in which the reader reads the sheet on the platen, wherein the controller allows, in a case where a sheet of the first type having the test pattern formed thereon is placed on the tray, a second reading process in which the feeder conveys the sheet on the tray so that the reader reads the sheet on the tray, wherein the controller allows, in a case where a sheet of a second type having the test pattern formed thereon is placed on the platen, the first reading process in which the reader reads the sheet on the platen, wherein the controller displays, in a case where a sheet of the second type having the test pattern formed thereon is placed on the tray, the screen on the display without allowing the second reading process, and wherein the first type is different from the second type.

Further features of the present invention will become apparent from the following description of exemplary embodiments (with reference to the attached drawings).

BRIEF DESCRIPTION OF THE DRAWINGS

FIG. 4 is an exemplary diagram of a clock table.

FIG. 5 is an exemplary diagram of a readable/unreadable table.

FIG. 6 is a timing chart for when a signal is read from a CIS.

DESCRIPTION OF THE EMBODIMENTS

At least one embodiment of the present disclosure is described with reference to the accompanying drawings.

Image Forming Apparatus

Figure 1:
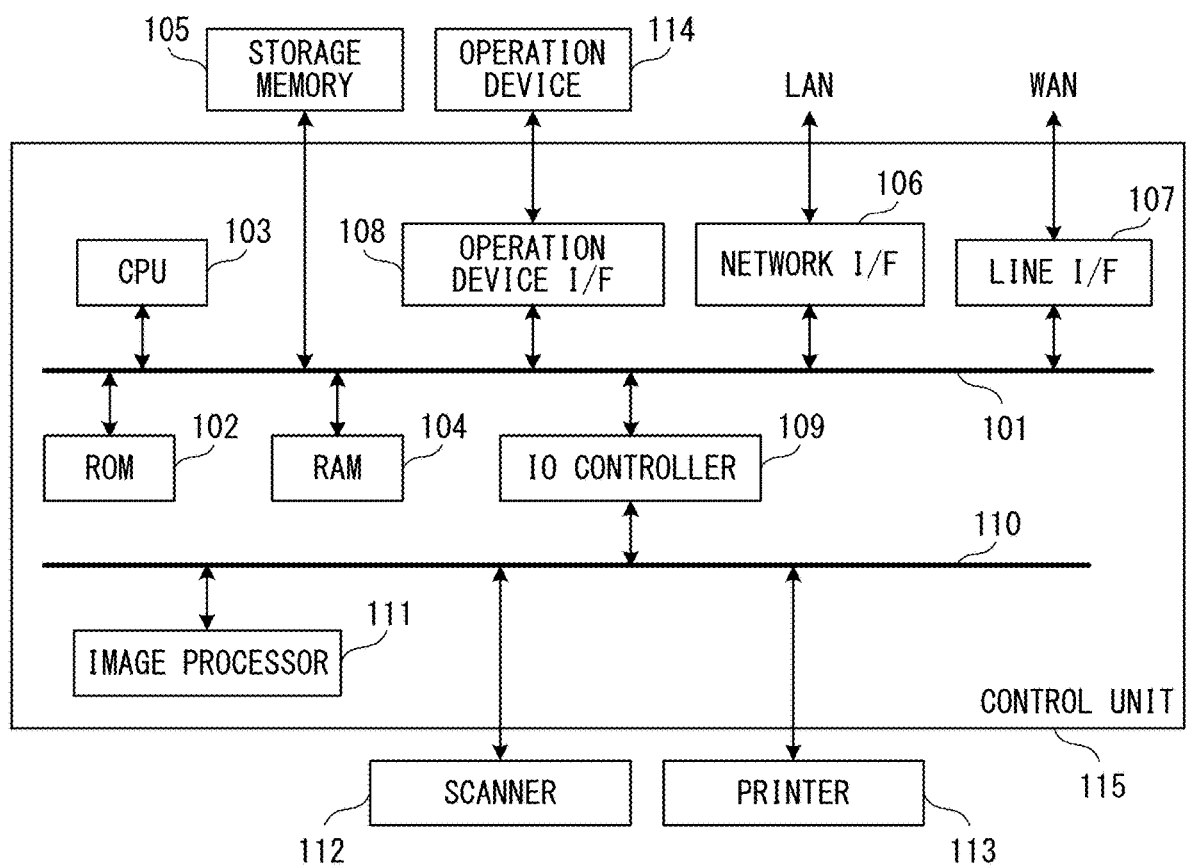
FIG. 1 is an explanatory diagram of a control unit in at least one embodiment of the present disclosure.

FIG. 1 is an explanatory diagram of a control unit configured to control operation of an image forming apparatus according to at least one embodiment. A control unit 115 includes a system bus 101 and an image bus 110. The system bus 101 and the image bus 110 are connected to each other via an IO controller 109. The IO controller 109 is a bus bridge configured to perform conversion of the data structure between the system bus 101 and the image bus 110, and other processes. The image bus 110 is formed of a general-purpose bus, such as a PCI bus, IEEE 1394, or PCI-Ex, and is configured to perform high-speed transfer of image data.

To the system bus 101, a central processing unit (CPU) 103, a read only memory (ROM) 102, and a random access memory (RAM) 104 are connected. Further, to the system bus 101, an operation device interface (I/F) 108, a network I/F 106, and a line I/F 107 are connected. To the image bus 110, an image processor 111 is connected. To the control unit 115, a storage memory 105, an operation device 114, a scanner 112, and a printer 113 are connected. The storage memory 105 is connected to the system bus 101. The operation device 114 is connected to the operation device I/F 108. The scanner 112 and the printer 113 are connected to the image bus 110.

The CPU 103 is configured to execute a boot program, which is stored in the ROM 102, on startup of the image forming apparatus. The CPU 103 is also configured to execute a control program, which is stored in the storage memory 105, to control operation of the scanner 112 and the printer 113. When a program is executed, the RAM 104 is used as a work area. The RAM 104 also serves as an image memory configured to provide a temporary storage during image processing. The storage memory 105 is used as an internal storage. In the storage memory 105, data read by the scanner 112, the image data, and other data are stored. As the storage memory 105, a hard disk drive (HDD) or a solid state drive (SSD) may be used.

The network I/F 106 is a communication interface for performing communication to/from another device via a local area network (LAN). The line I/F 107 is a communication interface for performing communication to/from another device via a wide area network (WAN). The operation device I/F 108 is an interface for transmitting/receiving data to/from the operation device 114. The operation device 114 is a user interface including an input device and an output device. The input device is comprised of input keys, for example, numeric keys, or a touch panel. The output device is a display, a loudspeaker, or other device. An instruction or data input from the input device is input to the CPU 103 via the operation device I/F 108. The output device is configured to output various kinds of information by the display or other device in accordance with, for example, the instruction acquired via the operation device I/F 108. The operation device 114 in at least one embodiment is formed of, for example, a liquid crystal display (LCD) touch panel, and is configured to display an image corresponding to a VGA signal acquired from the operation device I/F 108.

The image processor 111 is connected to the scanner 112, which is an image input device, and to the printer 113, which is an image output device, via the image bus 110. The image processor 111 is formed of a plurality of application specific integrated circuits (ASICs) configured to perform image processing, such as resolution conversion, compression and decompression, or binary/multi-value conversion, on input and output pixel data.

Scanner

Figure 2:
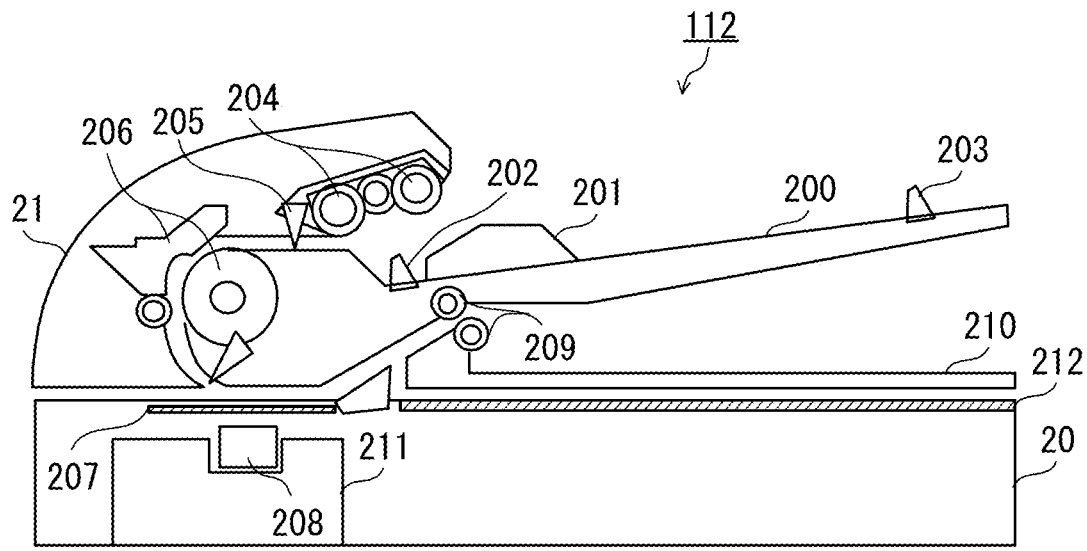
FIG. 2 is a view of the structure of a scanner.

FIG. 2 is a view of the structure of the scanner 112. The scanner 112 in at least one embodiment includes a reader 20 and an auto document feeder (ADF) 21. The ADF 21 includes a document tray 200, on which documents to be read are to be placed, and a delivery tray 210, on which the read documents are to be delivered. The document tray 200 includes a document photosensor 202 configured to detect presence/absence of a placed document, a pair of document guides 201, and a document size detection sensor 203. Two document guides 201 are provided side by side in a longitudinal direction of the document (direction orthogonal to a conveyance direction of the document). The documents are conveyed one by one along a conveyance path from the document tray 200 and delivered to the delivery tray 210. An image is read from each document by the reader 20 while the document is conveyed along the conveyance path.

On the conveyance path, in order from an upstream side in the conveyance direction, pickup rollers 204, conveyance rollers 206, and delivery rollers 209 are provided. The pickup rollers 204 are conveyance members configured to take documents stacked on the document tray 200 into the conveyance path. The pickup rollers 204 are configured to convey the documents one by one from the document tray 200 to the conveyance path. The conveyance rollers 206 are conveyance members configured to convey the document that has been taken into the conveyance path by the pickup rollers 204 to the delivery rollers 209 via a position at which the document is read by the reader 20. The delivery rollers 209 are conveyance members configured to deliver the document that has been conveyed by the conveyance rollers 206 to the delivery tray 210.

On the conveyance path, a document passage detection sensor 205 is provided on a downstream side of the pickup rollers 204. The document passage detection sensor 205 is configured to detect the document that is conveyed to the conveyance rollers 206 by the pickup rollers 204. Based on a time period during which the document passage detection sensor 205 detects the document, the end of passing of one document is determined. The pickup rollers 204, the conveyance rollers 206, and the delivery rollers 209 are driven by a stepping motor (not shown).

The reader 20 includes a sensor unit 211 including a light source and a contact image sensor (CIS) 208. The reader 20 includes, on the ADF 21 side, a platen 212 on which a document is to be placed, and a reading window 207. The reading window 207 is provided at a position corresponding to the reading position on the conveyance path. The sensor unit 211 can not only read an image from the document conveyed by the ADF 21 through the reading window 207, but also read an image from the document placed on the platen 212.

When an image of the document conveyed by the ADF 21 is to be read, the light source radiates light toward the reading window 207. When the document conveyed by the ADF 21 passes through the reading position on the conveyance path, the CIS 208 reads an image by receiving, through the reading window 207, reflected light obtained by the light radiated from the light source being reflected by the document. The CIS 208 reads the image with the direction orthogonal to the conveyance direction of the document being a main scanning direction. In this case, the CIS 208 stops below the reading window 207.

When the document placed on the platen 212 is to be read, the sensor unit 211 moves below the platen 212 in a sub-scanning direction orthogonal to the main scanning direction. In the meantime, the light source radiates light toward the document. The sensor unit 211 reads an image by receiving reflected light obtained by the light being reflected by the document placed on the platen 212 while moving in the sub-scanning direction.

The reading window 207 is configured to have a predetermined length in the sub-scanning direction. The CIS 208 can read an image while moving within a range of the length. The CIS 208 is formed of a plurality of photoelectric conversion elements, such as CCD elements and CMOS elements. The CIS 208 includes a first-in first-out (FIFO) memory configured to store electric charges of the photo-electric conversion elements, and is configured to control the FIFO memory and the photoelectric conversion elements. The CIS 208 is generally formed of the plurality of photo-electric conversion elements arrayed in line in the main scanning direction. A case in which the CIS 208 in at least one embodiment uses CCD elements as the photoelectric conversion elements is described.

Figure 3:
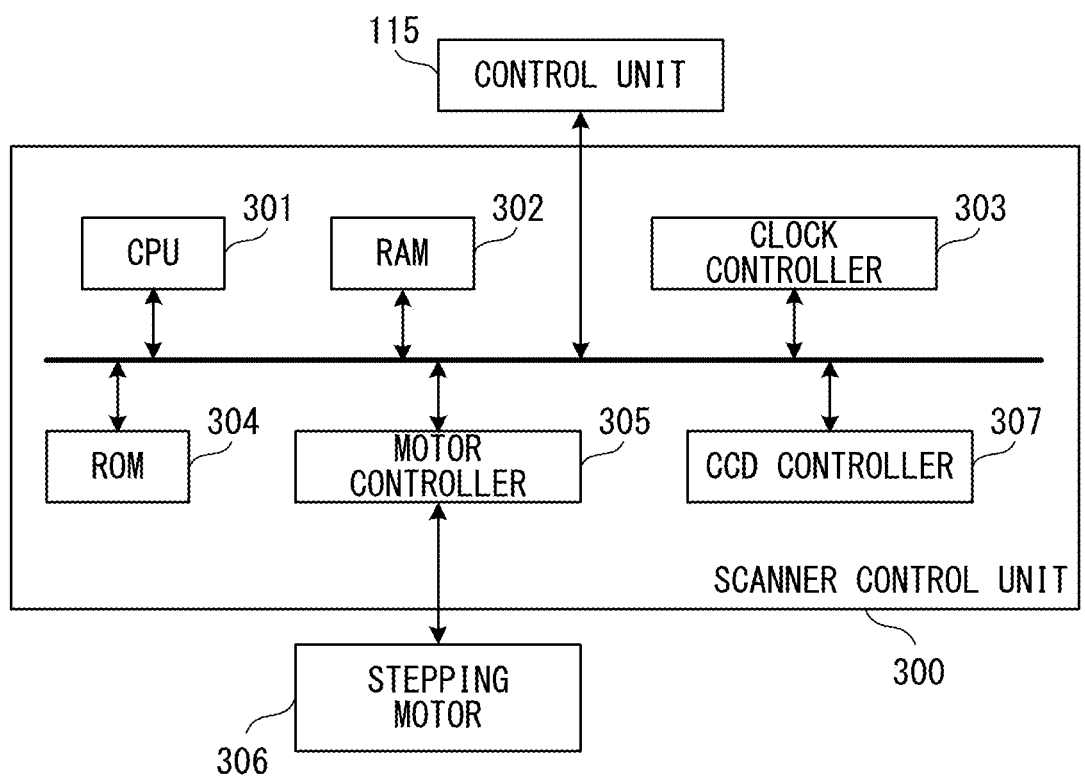
FIG. 3 is an explanatory diagram of a scanner control unit.

FIG. 3 is an explanatory diagram of a scanner control unit configured to control the operation of the scanner 112. The scanner control unit, which is denoted by 300, is communicable to/from the control unit 115 of the image forming apparatus. The scanner control unit 300 includes a CPU 301, a ROM 304, a RAM 302, a clock controller 303, a motor controller 305, and a CCD controller 307. To the motor controller 305, a stepping motor 306 configured to drive the pickup rollers 204, the conveyance rollers 206, and the delivery rollers 209, which are provided in the ADF 21, is connected.

The CPU 301 is configured to execute a control program, which is stored in the ROM 304, to control the operation of the scanner 112. When a program is executed, the RAM 302 is used as a work area. Further, in the RAM 302, image data indicating an image read by the CIS 208 is stored. The clock controller 303 is formed of a crystal resonator, and a phase locked loop (PLL) configured to multiply or divide a clock generated by the crystal resonator, to generate a clock signal. The clock controller 303 is configured to distribute the generated clock signal to the motor controller 305, the CCD controller 307, and the RAM 302. The clock controller 303 performs the generation and the distribution of the clock signal in accordance with the instruction to read an image from the control unit 115.

The motor controller 305 is configured to multiply or divide the clock signal acquired from the clock controller 303 to generate a control clock for the stepping motor 306. The CCD controller 307 is configured to multiply or divide the clock signal acquired from the clock controller 303 to generate a control clock (read clock) for the CCD elements. From the RAM 302, the stored image data is transferred to the control unit 115 based on the clock signal.

The clock signals used in the motor controller 305, the CCD controller 307, and the RAM 302 are not necessarily the same. To the clock controller 303, a PLL is set depending on color/monochrome distinction, a resolution, a material of the document, or other information included in the reading instruction acquired from the control unit 115. The scanner 112 can change a reading speed, and mainly a conveyance speed of the document in a case where frequencies of the various clock signals are changed through a change in setting of the PLL.

In general, as a frequency at which the PLL is operated becomes higher, a clock frequency of the motor controller 305 becomes higher, and a rotating speed of the stepping motor 306 becomes higher. Therefore, the conveyance speed of the document becomes higher. Setting of various PLLs for the scanner control unit 300 to execute the image reading is performed by referring to a table, for example, a clock table stored in the RAM 302. FIG. 4 is an exemplary diagram of the clock table. In the clock table, which is denoted by 501, plain paper, a first cardboard, and a second cardboard are exemplified as media types (paper types). For each media type, a frequency of the clock signal for controlling the conveyance of the document is set.

In this example, the plain paper is, for example, wood-free paper having a basis weight of 64 g/m² or more and less than 106 g/m². The first cardboard is, for example, wood-free paper having a basis weight of 106 g/m² or more and less than 129 g/m². The second cardboard is, for example, wood-free paper having a basis weight of 129 g/m² or more and less than 150 g/m². A basis weight of a sheet that can be conveyed by the ADF 21 is, for example, less than 220 g/m². In other words, when a document is to be copied, the ADF 21 can convey the plain paper, the first cardboard, and the second cardboard. Meanwhile, when calibration is to be executed, the ADF 21 permits conveyance of the plain paper and the first cardboard, and does not permit conveyance of the second cardboard. This is because, in the calibration, it is required to convey a test chart at higher accuracy than in copying.

The clock controller 303 acquires, from the clock table 501, control clock information (conveyance control clock) corresponding to information notified as the media type. The clock controller 303 generates the clock signal based on the control clock information. The scanner control unit 300 performs control for conveying the document and control for transferring the image data based on the thus-generated clock signal. In at least one embodiment, the clock table 501 is referred to based on the media type to be read notified from the control unit 115 at the time when the reading is executed. Alternatively, the clock controller 303 may acquire the control clock information from a row of the clock table 501 that is specified by the control unit 115.

In at least one embodiment, the second cardboard is a paper type (media type) from which an image is unreadable with the use of the ADF 21. In the clock table 501, the conveyance control clock is set to 0 MHz for a second cardboard reading mode, which is an operation mode for reading the second cardboard. With the conveyance control clock being 0 MHz, the scanner control unit 300 can determine that the second cardboard is unreadable. The information on whether an image is readable from each paper type with the use of the ADF 21 is set at the time of initialization of the control unit 115 and the scanner control unit 300.

The scanner control unit 300 generates the clock table 501 based on a readable/unreadable table stored in the RAM 104 of the control unit 115. FIG. 5 is an exemplary diagram of the readable/unreadable table. The readable/unreadable table, which is denoted by 901, is a table in which the information indicating whether an image is readable with the use of the ADF 21 and a reading speed are set for each media type (each paper type). The readable/unreadable table 901 is used in reading the test chart.

Timings of speed control and CIS control in reading an image are described in detail. A signal is read from each CCD element of the CIS 208 based on the read clock and a transfer enable clock for determining whether or not to transfer the read signal to the control unit 115. The transfer enable clock is a clock signal used in the RAM 302. Based on the read clock and the transfer enable clock, a transfer amount of the signals read from the CIS 208 to the control unit 115 is controlled. FIG. 6 is a timing chart for when a signal is read from the CIS 208.

The CCD controller 307 performs reading of the signal from each CCD element based on a read clock 401. Output pixel data 402, which is the signal of each CCD element, is taken into the FIFO memory of the CIS 208 at a rising timing of the read clock 401. The output pixel data 402 taken into the FIFO memory is stored in the RAM 302 as appropriate by the CCD controller 307.

The output pixel data 402 stored in the RAM 302 is transferred to the control unit 115 in synchronization with rising of the transfer enable clock, which is denoted by 403. The transfer enable clock 403 is generated in synchronization with a horizontal synchronizing signal 404 by the clock controller 303. The horizontal synchronizing signal 404 is a clock signal for giving an instruction to start reading signals of the output pixel data 402 corresponding to one line, which is read in one period by all the CCD elements of the CIS 208, from the CCD elements. The output pixel data 402 corresponding to one line is image data of one line.

The motor controller 305 generates, in synchronization with the horizontal synchronizing signal 404, a motor control signal 405, which is a PWM signal for controlling the rollers provided on the conveyance path of the ADF 21 to be driven. As a period of the horizontal synchronizing signal 404 becomes shorter, rotating speeds of the rollers of the ADF 21 become higher. As a result, the conveyance speed of the document becomes higher, and the reading speed of the document per sheet becomes higher. With the same number X of pixels of CCD elements in one line, when the period of the horizontal synchronizing signal 404 becomes shorter, it is required to perform reading from all the CCD elements in a short period of time, and hence a period of the read clock 401 becomes shorter. When the period of the read clock 401 becomes shorter, storage of the output pixel data 402 in the RAM 302 becomes faster. In synchronization therewith, it is also required to output data from the RAM 302 to the control unit 115 in a short period of time.

As a result, an amount of the output pixel data 402 transferred per unit time from the scanner 112 to the RAM 104 and the image processor 111 of the control unit 115 via the image bus 110 is increased. When the amount of data transferred per unit time becomes larger, loads on the image processor 111 and the image bus 110 become larger. In this case, for example, delays may occur in image processing and data transfer for executing a print job in the printer 113.

When the motor controller 305 outputs one pulse of the motor control signal 405, the rollers of the ADF 21 rotate so as to convey the document by one line. Therefore, the motor controller 305 generates a pulse of the motor control signal 405 before a pulse of the horizontal synchronizing signal 404. In other words, the timing to issue the clock is controlled so that the horizontal synchronizing signal 404 is issued after a predetermined time for oscillations to be stabilized has elapsed after issuance of the motor control signal 405.

Processes at the Time of Calibration

Operations of printing a test pattern on a sheet and reading the test pattern at the time of the calibration are described in detail below. In at least one embodiment, an example of performing tone correction by the calibration is described. The calibration is equally applicable to all cases in which a test pattern is formed on a sheet to generate a test chart by the printer 113, the test pattern is read from the test chart by the scanner 112, and image forming conditions are corrected based on a result of the reading. For example, the calibration in at least one embodiment is applicable to image density correction, image position correction, density unevenness correction, and other correction.

In the image density correction, a density of an image to be formed by the printer 113 is adjusted. When the image density correction is executed, for example, the CPU 103 generates, based on a result of reading the test chart, a tone correction table as a conversion condition for converting an input signal value of image data into an output signal value. The image processor 111 converts the input signal value of the image data transferred from an external device based on the tone correction table. The CPU 103 causes the printer 113 to form an output image based on image data obtained as a result of the conversion.

Further, in the image position correction, a geometric characteristic of an image to be formed on a sheet is adjusted. When the image position correction is executed, for example, the CPU 103 detects, based on the result of reading the test chart, a deviation in geometric characteristic of the image to be formed on the sheet, and determines a correction value for correcting the geometric characteristic based on a result of the detection. The image processor 111 performs affine transformation on the image data based on the above-mentioned correction value, to thereby correct the geometric characteristic of the image to be formed based on the image data after the affine transformation.

In at least one embodiment, a description is given with media types (sheet types) that are readable with the use of the ADF 21 being the plain paper and the first cardboard, and a media type that is unreadable with the use of the ADF 21 being the second cardboard. For simplicity of the description, the description is given with those three media types, but the media types are not limited to the three types.

Figure 7A:
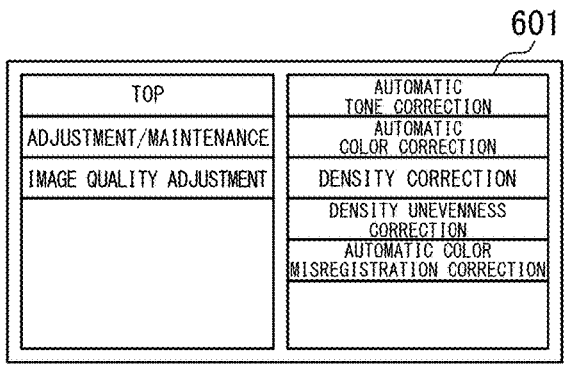
FIG. 7A, FIG. 7B, FIG. 7C, FIG. 7D, FIG. 7E, FIG. 7F, and FIG. 7G are exemplary diagrams of operation screens.
Figure 7B:
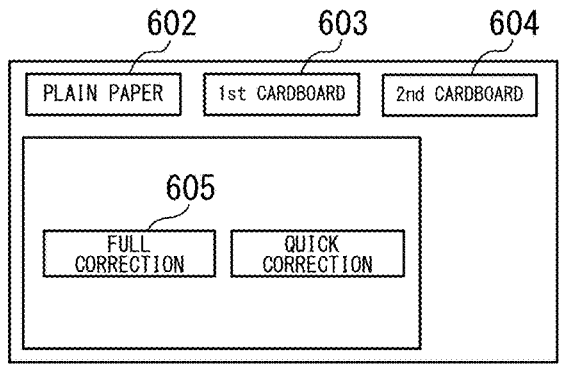

FIG. 7A to FIG. 7G are exemplary diagrams of operation screens to be displayed on the display of the operation device 114 at the time when the calibration is executed. When the calibration is started, the operation screen of FIG. 7A is displayed on the display of the operation device 114. A user selects an item to be corrected from the operation screen. In at least one embodiment, in order to perform the tone correction, the user presses a key 601 of "automatic tone correction" through the input device of the operation device 114 to select execution of the automatic tone correction. In response to the pressing of the key 601, the operation screen of FIG. 7B is displayed on the display of the operation device 114.

The user selects, from the operation screen of FIG. 7B, one paper type (media type) of a sheet to be used in generating the test chart. In this example, any one of the plain paper, the first cardboard, and the second cardboard is selected. The plain paper is readable with the use of the ADF 21 without requiring any special process. The first cardboard is readable with the use of the ADF 21 with a change in conveyance speed. The second cardboard is unreadable with the use of the ADF 21.

In a case where the calibration is to be performed on the plain paper, the user presses a calibration execution key 602 through the input device of the operation device 114. In a case where the calibration is to be performed on the first cardboard, the user presses a calibration execution key 603 through the input device of the operation device 114. In a case where the calibration is to be performed on the second cardboard, the user presses a calibration execution key 604 through the input device of the operation device 114. The test pattern is formed on the sheet of the type selected here to generate the test chart.

After selecting the type of the sheet on which to form the test pattern, the user selects a calibration type. In at least one embodiment, an example in which a full correction key 605 is pressed to be selected is described.

In a case where the full correction key 605 is selected, the control unit 115 switches among the operation screens depending on the media type selected in FIG. 7B. Depending on which one of the calibration execution keys 602 to 604 is pressed, an operation screen (one of FIG. 7C to FIG. 7E) for selecting a cassette storing a sheet on which to print the test pattern is displayed. In a case where the calibration execution key 602 is pressed, the operation screen of FIG.

7C is displayed. In a case where the calibration execution key 603 is pressed, the operation screen of FIG. 7D is displayed. In a case where the calibration execution key 604 is pressed, the operation screen of FIG. 7E is displayed.

Depending on the pressed one of the calibration execution keys 602 to 604, the CPU 103 determines a sheet of which media type on which to perform the correction. The CPU 103 stores a result of the determination as a variable M in the RAM 104. The variable M is "0" in a case where the calibration execution key 602 is selected (plain paper), is "1" in a case where the calibration execution key 603 is selected (first cardboard), and is "2" in a case where the calibration execution key 604 is selected (second cardboard).

Figure 7C:
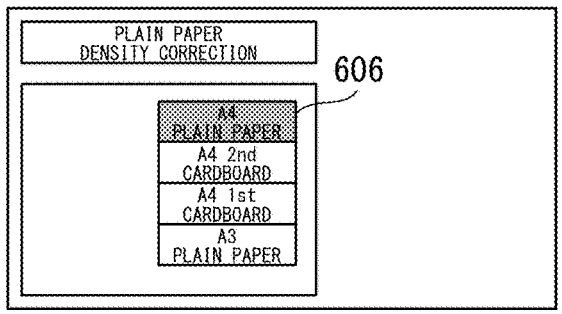
Figure 7D:
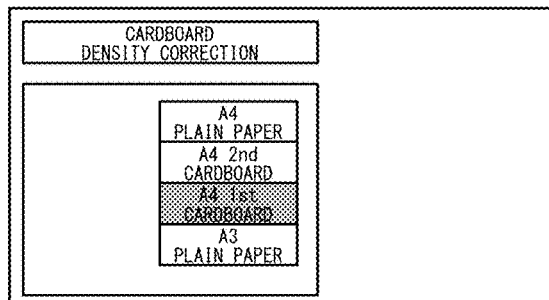
Figure 7E:
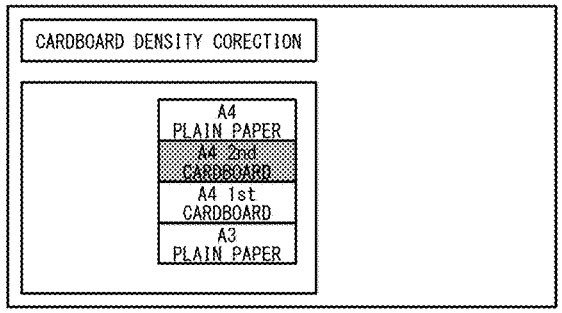
Figure 8:
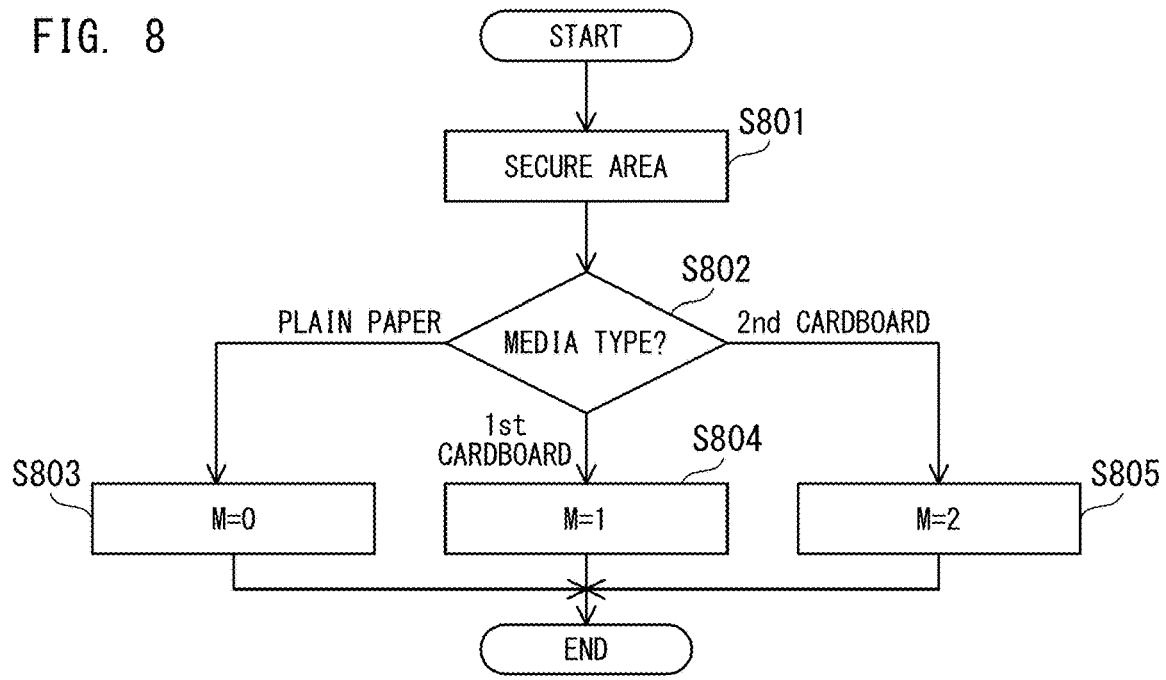
FIG. 8 is a flow chart for illustrating a process of selecting a media type.

FIG. 8 is a flow chart for illustrating a process of selecting a media type of a sheet to be used for the calibration. This process is a process in which the CPU 103 stores, depending on an input from the operation device 114, information (variable M) indicating the selected media type in the RAM 104. The variable M is used in determining a reading mode (whether or not to use the ADF 21), which is to be described later. The CPU 103 secures, at the time of displaying the operation screen of FIG. 7B, an area for storing the variable M in the RAM 104 (Step S801). In a case where the calibration execution key 602 is pressed from the operation screen of FIG. 7B (Step S802: plain paper), the CPU 103 sets "0" to the variable M, and displays the operation screen of FIG. 7C (Step S803). In a case where the calibration execution key 603 is pressed from the operation screen of FIG. 7B (Step S802: first cardboard), the CPU 103 sets "1" to the variable M, and displays the operation screen of FIG. 7D (Step S804). In a case where the calibration execution key 604 is pressed from the operation screen of FIG. 7B (Step S802: second cardboard), the CPU 103 sets "2" to the variable M, and displays the operation screen of FIG. 7E (Step S805).

The operation screens of FIG. 7C to FIG. 7E schematically show media types (paper types) and sizes of sheets stored in sheet feeding cassettes provided to the printer 113, respectively. Those operation screens prompt the user to press a key on the operation screens. The user selects a sheet feeding cassette storing a sheet on which the test chart for use in the calibration is to be generated. Sheet feeding cassettes other than the media type selected in the operation screen of FIG. 7B are unselectable, and hence are, for example, lightly grayed out. The selected sheet feeding cassette (for example, key 606) is highlighted to explicitly show the user as being the selected sheet feeding cassette.

Figure 7F:
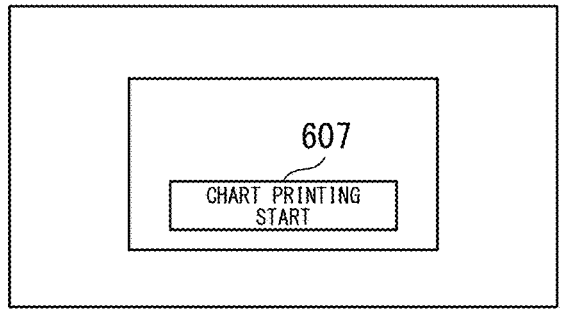

In a case where the sheet feeding cassette is selected, the CPU 103 displays the operation screen of FIG. 7F. The operation screen is a screen for giving an instruction to generate the test chart. A chart printing start key 607 is pressed through the input device of the operation device 114, the CPU 103 prints the test pattern on a sheet of the selected paper type by the printer 113 to generate the test chart. The printer 113 forms, in accordance with image data of the test pattern acquired from the image processor 111, the test pattern on the sheet stored in the selected sheet feeding cassette, to generate the test chart for calibration.

Figure 7G:
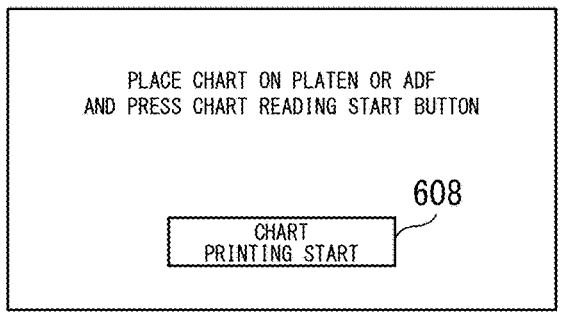

After printing the test chart, the CPU 103 displays the operation screen of FIG. 7G on the display of the operation device 114. The operation screen of FIG. 7G is a screen for prompting, in order to read the test chart with the scanner 112, the user to set the test chart on the scanner 112. After placing the test chart on the platen 212 or the document tray 200, the user presses a chart reading start key 608 through the input device of the operation device 114. In response to the pressing of the chart reading start key 608, the CPU 103 performs a process of reading the test chart by the scanner 112.

Figure 9:
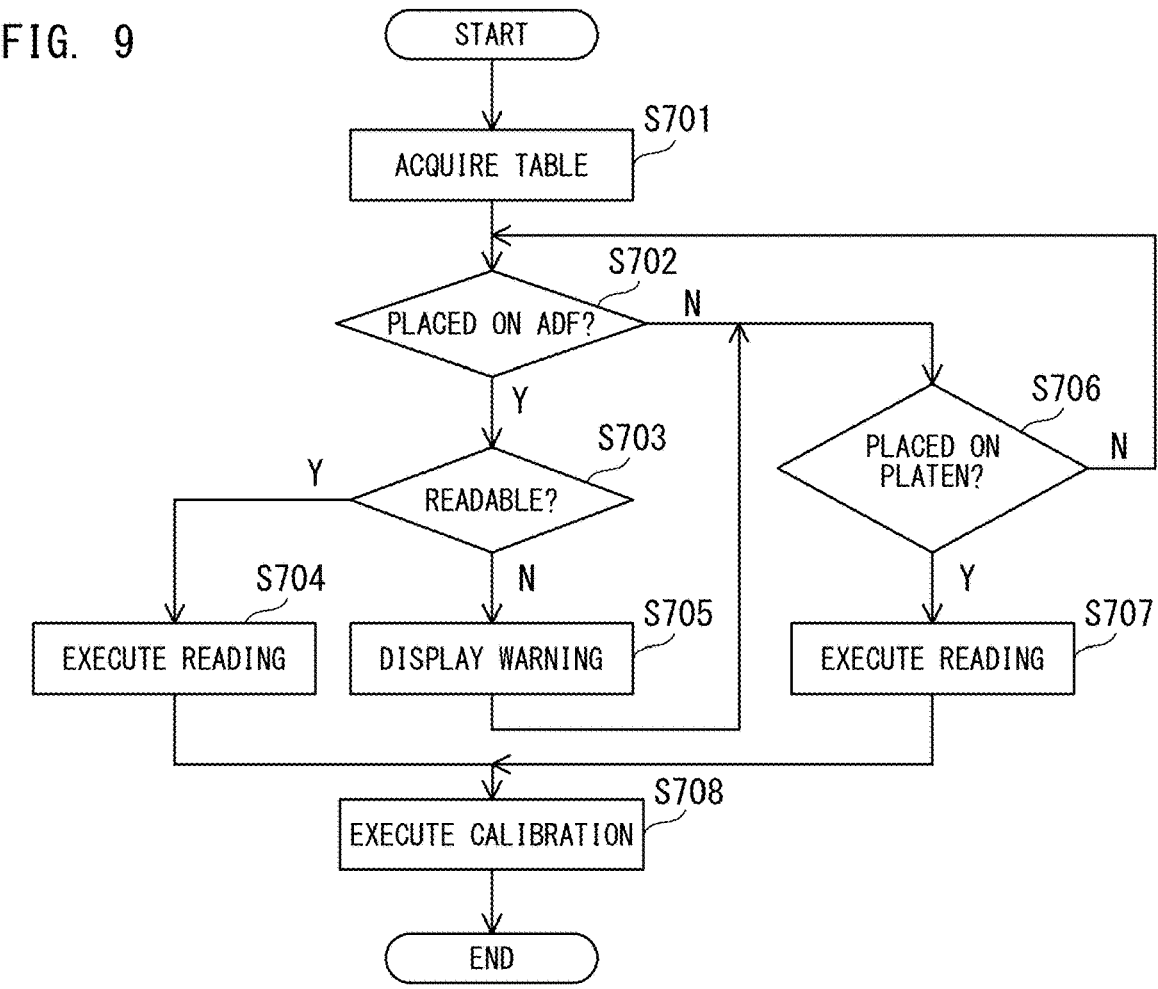
FIG. 9 is a flow chart for illustrating processes of reading a test chart.

FIG. 9 is a flow chart for illustrating processes of reading the test chart.

The CPU 103 acquires the readable/unreadable table 901 from the RAM 104 (Step S701). As described above, the readable/unreadable table 901 is stored in the RAM 104 at the time of initialization process. The CPU 103 determines whether the test chart is placed on the document tray 200 of the ADF 21 (Step S702). The CPU 103 performs the determination based on a result of detection by the document photosensor 202 provided to the document tray 200. The document photosensor 202 is a photointerrupter, but a system in which the test chart on the document tray 200 is detected by a mechanical sensor may be adopted instead.

In a case where the test chart is placed on the document tray 200 (Step S702: Y), the CPU 103 determines whether the media type of the sheet selected at the time of the generation of the test chart is a type that is readable with the use of the ADF 21 (Step S703). The CPU 103 refers to the variable M indicating the media type, which is stored in the RAM 104. The CPU 103 compares a value of the variable M and the readable/unreadable table 901 to determine whether the test chart is a sheet of a media type that is readable with the use of the ADF 21. The value of the variable M and an ID of the media type of the readable/unreadable table 901 correspond to each other. The CPU 103 refers to whether the media type of an ID corresponding to the value of the variable M is readable. In at least one embodiment, in a case where the variable M is 0 or 1 (case of the plain paper or the first cardboard), the CPU 103 determines that the test chart is readable with the use of the ADF 21. In a case where the variable M is 2 (case of the second cardboard), the CPU 103 determines that the test chart is unreadable with the use of the ADF 21.

In the case where the test chart is readable (Step S703: Y), the CPU 103 notifies the scanner 112 of a reading command to read the test chart with the use of the ADF 21 (Step S704). The scanner 112 acquires the reading command to perform the process of reading the test pattern from the test chart with the use of the ADF 21. At this time, the CPU 103 gives an instruction on a conveyance control clock at the time of reading based on the media type. The CPU 103 determines the conveyance control clock based on the media type of the test chart and the clock table 501. The CPU 103 notifies the scanner control unit 300 of the determined conveyance control clock. In a case where the sheet of the test chart is the plain paper, the CPU 103 determines on a normal conveyance control clock. In a case where the sheet of the test chart is the first cardboard, the CPU 103 determines on a conveyance control clock that is slower than the normal conveyance control clock.

The scanner control unit 300 performs control for conveying the test chart, control on the CCD elements of the CIS 208, and control to turn on the light source of the sensor unit 211, to thereby read the test pattern from the test chart. The scanner control unit 300 transmits image data indicating the read test pattern to the control unit 115.

The control unit 115 causes the image processor 111 to sequentially process the image data acquired from the scanner control unit 300 so that a calibration process can be performed thereon, and stores the processed image data in the RAM 104. When storage of the image data corresponding to one page has completed, the CPU 103 executes the calibration based on the stored image data (Step S708).

Figure 10:
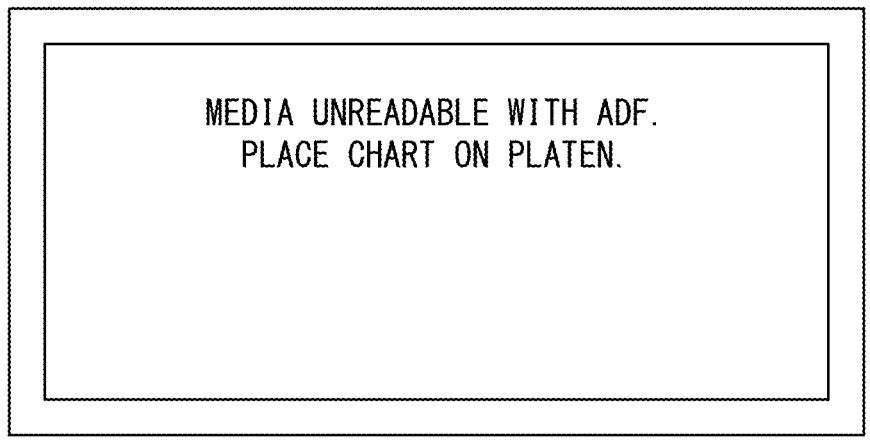
FIG. 10 is an exemplary diagram of a warning screen.

In a case where the test chart is a sheet of a media type that is unreadable with the use of the ADF 21 (Step S703: N), the CPU 103 displays a warning screen for notifying the user that an unreadable sheet is placed on the ADF 21 (Step S705). In at least one embodiment, in a case where the test chart is generated with the second cardboard, the CPU 103 determines that the test chart is a sheet of a media type that is unreadable with the use of the ADF 21. FIG. 10 is an exemplary diagram of the warning screen. On the warning screen, a notification representing that the test chart is unreadable with the use of the ADF 21 is made, and an instruction to place the test chart on the platen 212 is given.

In a case where the test chart is not placed on the document tray 200 (Step S702: N), or after the warning screen is displayed, the CPU 103 determines whether the test chart is placed on the platen 212 (Step S706). In a case where the test chart is not placed on the platen 212 (Step S706: N), the CPU 103 determines again whether the test chart is placed on the document tray 200 of the ADF 21.

In a case where the test chart is placed on the platen 212 (Step S706: Y), the CPU 103 notifies the scanner 112 of the reading command to read the test chart from the platen 212 (Step S707). Upon acquiring this reading command, the scanner 112 performs the processes of reading the test pattern from the test chart with the use of the platen 212. The scanner control unit 300 performs control on the CCD elements of the CIS 208, and control to turn on the light source of the sensor unit 211, to thereby read the test pattern from the test chart. The scanner control unit 300 transmits image data indicating the read test pattern to the control unit 115. The control unit 115 causes the image processor 111 to sequentially process the image data acquired from the scanner control unit 300 so that a calibration process can be performed thereon, and stores the processed image data in the RAM 104. When storage of the image data corresponding to one page has completed, the CPU 103 executes the calibration based on the stored image data (Step S708).

As described above, irrespective of whether the user places the test chart for calibration on the document tray 200 of the ADF 21 or the platen 212, the image forming apparatus can perform the processes of reading the test chart under an appropriate procedure. Further, in a case where the test chart generated with a sheet that is unreadable with the use of the ADF 21 is placed on the document tray 200, the image forming apparatus can give a warning so that the test chart is placed on the platen 212. As a result, work of the user is saved. Further, the failure of the calibration and the damage of the scanner 112 can be prevented.

The process of Step S703 can be performed not only by the method of using the readable/unreadable table 901 but also by a method of using the clock table 501. For example, the CPU 103 checks a conveyance control clock of a media type corresponding to the variable M stored in the RAM 104 by referring to the clock table 501. In a case where the conveyance control clock is 0, the CPU 103 determines that the test chart is a sheet of a media type that is unreadable with the use of the ADF 21. In a case where the conveyance control clock is not 0, the CPU 103 determines that the test chart is a sheet of a media type that is readable with the use of the ADF 21.

Modification Example

In the above-mentioned example, the image forming apparatus automatically detects on which of the document tray 200 and the platen 212 the test chart is placed to perform the processes of reading the test chart. In a modification example of the present disclosure, the user selects whether to use the ADF 21 to read the test chart or to use the platen 212 to read the test chart.

Figure 11A:
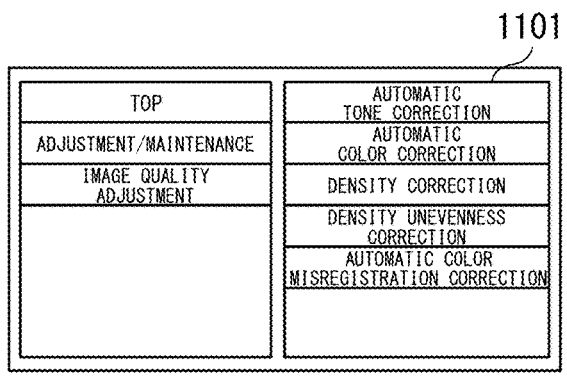
FIG. 11A, FIG. 11B, FIG. 11C, FIG. 11D, FIG. 11E, and FIG. 11F are exemplary diagrams of operation screens.
Figure 11B:
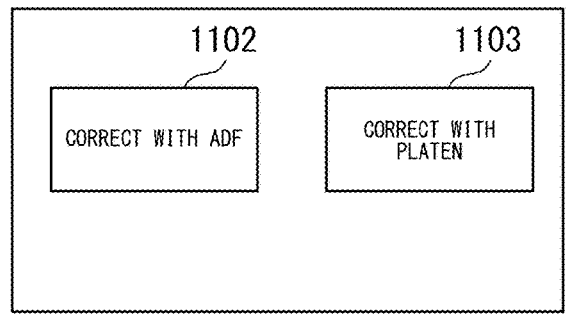
Figure 11C:
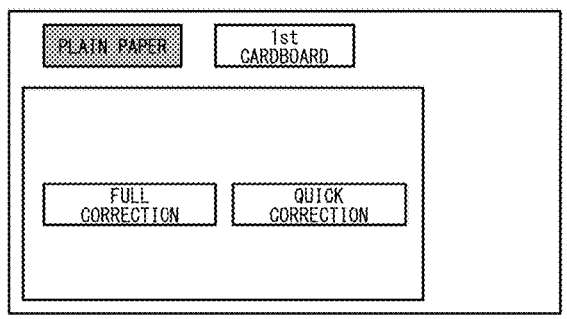
Figure 11D:
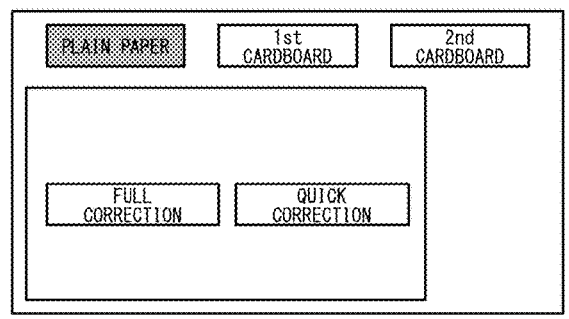

FIG. 11A to FIG. 11F are exemplary diagrams of operation screens to be displayed on the display of the operation device 114 at the time when the calibration is executed in this case. When the calibration is started, the operation screen of FIG. 11A is displayed on the display of the operation device 114. A user selects an item to be corrected from the operation screen. In this modification example, in order to perform the tone correction, the user presses a key 1101 of "automatic tone correction" through the input device of the operation device 114 to select execution of the automatic tone correction. In response to the pressing of the key 1101, the operation screen of FIG. 11B is displayed on the display of the operation device 114.

The user can select, through the operation screen of FIG. 11B, whether to use the ADF 21 to read the test chart, or to use the platen 212 to read the test chart. The user selects one of a "correct with ADF" key 1102 and a "correct with platen" key 1103 through the input device of the operation device 114. The CPU 103 switches between processes of reading depending on a result of the selection through the operation device 114.

Figure 12:
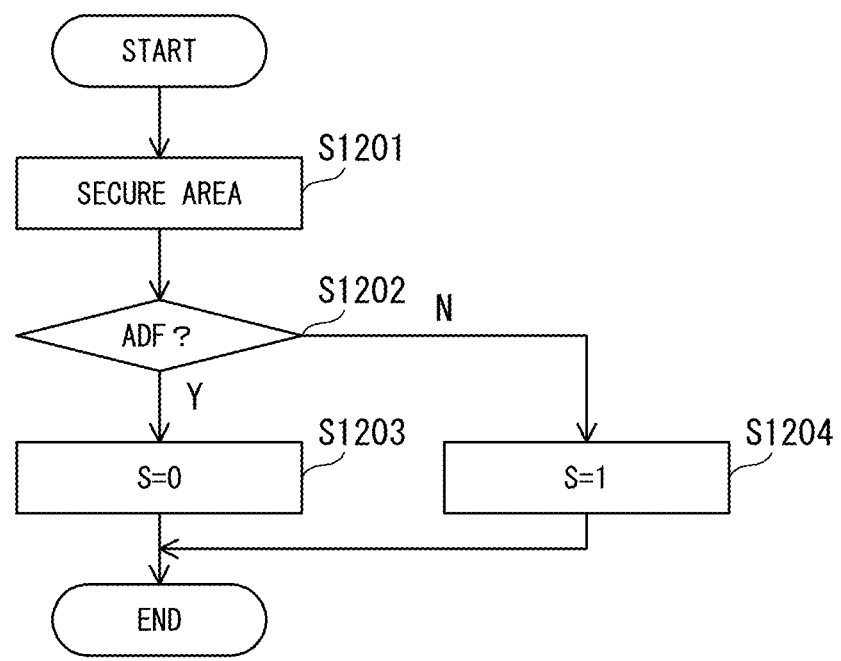
FIG. 12 is a flow chart for illustrating a process of switching between processes of reading.

FIG. 12 is a flow chart for illustrating a process of switching between the processes of reading.

The CPU 103 secures an area for storing a variable S indicating a source from which to read the test chart in the RAM 104 (Step S1201). The CPU 103 determines the key selected from the operation screen of FIG. 11B by the user through the input device of the operation device 114 (Step S1202).

In a case where the "correct with ADF" key 1102 is selected (Step S1202: Y), the CPU 103 sets 0 to the variable S, and displays the operation screen of FIG. 11C (Step S1203). On this operation screen, as a media type of a sheet for use in generating the test chart, the plain paper or the first cardboard, which is readable with the use of the ADF 21, can be selected. In a case where the "correct with platen" key 1103 is selected (Step S1202: N), the CPU 103 sets 1 to the variable S, and displays the operation screen of FIG. 11D (Step S1204). On this operation screen, as a media type of a sheet for use in generating the test chart, the plain paper, the first cardboard, or the second cardboard can be selected. The generation of the test chart and the selection of the media type are performed in the processes described above.

Figure 11E:
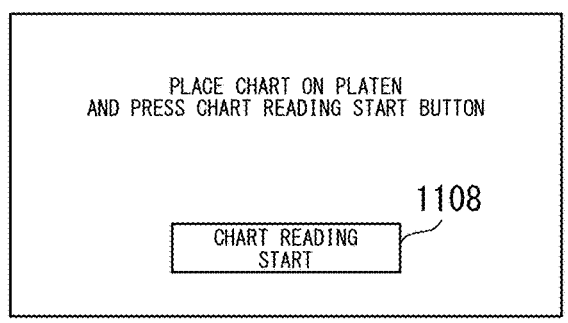
Figure 11F:
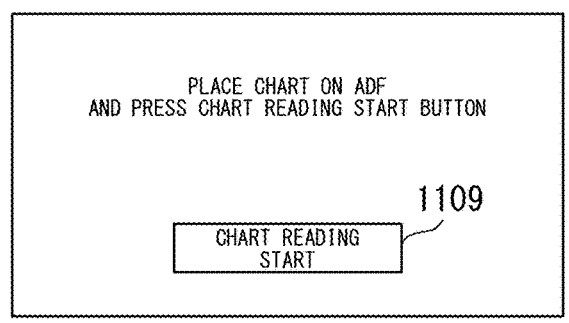

An instruction to read the test chart is given from the operation screen of FIG. 11E or the operation screen of FIG. 11F. FIG. 11E is an operation screen to be displayed in a case where the "correct with platen" key 1103 is selected on the operation screen of FIG. 11B (variable S=1). FIG. 11F is an operation screen to be displayed in a case where the "correct with ADF" key 1102 is selected on the operation screen of FIG. 11B (variable S=0). The CPU 103 refers to the variable S in the RAM 104 to display the operation screen of FIG. 11E or the operation screen of FIG. 11F on the display of the operation device 114.

Figure 13:
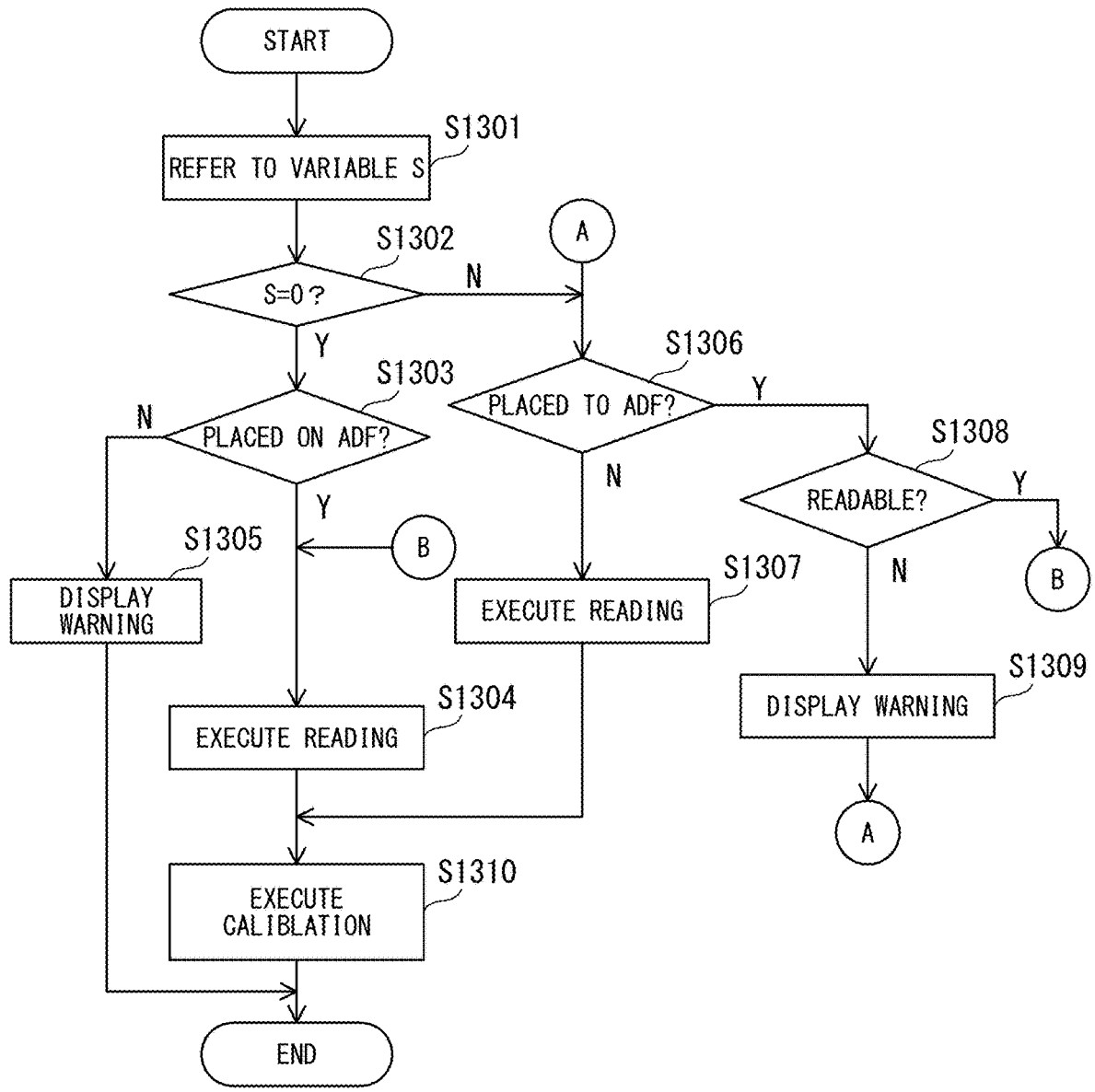
FIG. 13 is a flow chart for illustrating the processes of reading the test chart.

When one of chart reading start keys 1108 and 1109 on those operation screens is selected, reading of the test chart is started. FIG. 13 is a flow chart for illustrating the processes of reading the test chart.

The CPU 103 checks the result of selection by the user in FIG. 11B by referring to the variable S (Steps S1301 and S1302). In a case where the variable S is 0 (Step S1302: Y), the CPU 103 determines that an instruction to read the test chart with the use of the ADF 21 has been given. In this case, the CPU 103 determines, based on a result of detection by the document photosensor 202, whether the test chart is placed on the document tray 200 of the ADF 21 (Step S1303). In a case where the test chart is not placed on the document tray 200 (Step S1303: N), the CPU 103 notifies the operation device 114 that the test chart is not placed on the document tray 200, and ends the processing (Step S1305). Specifically, the CPU 103 displays a warning screen indicating that the test chart is not placed on the document tray 200.

In a case where the test chart is placed on the document tray 200 (Step S1303: Y), the CPU 103 notifies the scanner 112 of a reading command to read the test chart with the use of the ADF 21 (Step S1304). The scanner 112 acquires the reading command to perform the process of reading the test pattern from the test chart with the use of the ADF 21. The scanner control unit 300 performs control for conveying the test chart, control on the CCD elements of the CIS 208, and control to turn on the light source of the sensor unit 211, to thereby read the test pattern from the test chart. The scanner control unit 300 transmits image data indicating the read test pattern to the control unit 115. The control unit 115 causes the image processor 111 to sequentially process the image data acquired from the scanner control unit 300 so that a calibration process can be performed thereon, and stores the processed image data in the RAM 104. When storage of the image data corresponding to one page has completed, the CPU 103 executes the calibration based on the stored image data (Step S1310).

In a case where the variable S is 1 (Step S1302: N), the CPU 103 determines that an instruction to read the test chart with the use of the platen 212 has been given. In this case, the CPU 103 determines, based on a result of detection by the document photosensor 202, whether the test chart is placed on the document tray 200 of the ADF 21 (Step S1306). This is a process for determining whether the user has erroneously placed the test chart on the document tray 200 of the ADF 21.

In a case where the test chart is not placed on the document tray 200 (Step S1306: N), the CPU 103 notifies the scanner 112 of the reading command to read the test chart from the platen 212 (Step S1307). Upon acquiring this reading command, the scanner 112 performs the processes of reading the test pattern from the test chart with the use of the platen 212. The scanner control unit 300 performs control on the CCD elements of the CIS 208, and control to turn on the light source of the sensor unit 211, to thereby read the test pattern from the test chart. The scanner control unit 300 transmits image data indicating the read test pattern to the control unit 115. The control unit 115 causes the image processor 111 to sequentially process the image data acquired from the scanner control unit 300 so that a calibration process can be performed thereon, and stores the processed image data in the RAM 104. When storage of the image data corresponding to one page has completed, the CPU 103 executes the calibration based on the stored image data (Step S1310).

In a case where the test chart is placed on the document tray 200 (Step S1306: Y), the CPU 103 performs a protection process. The protection process is performed as follows. The CPU 103 checks, based on the variable M stored in the RAM 104, the type (media type) of the sheet used in generating the test chart to determine whether the test chart is readable with the use of the ADF 21 (Step S1308).

In a case where the test chart is readable with the use of the ADF 21 (Step S1308: Y), the CPU 103 instructs the scanner 112 to read the test chart with the use of the ADF 21, to thereby cause the scanner 112 to read the test chart (Step S1304). The CPU 103 executes the calibration based on a result of reading the test chart (Step S1310). When determining that the test chart is readable with the use of the ADF 21, the CPU 103 may provide, through the operation device 114, an operation screen for prompting the user to make a selection for switching to the process using the ADF 21.

In a case where the test chart is unreadable with the use of the ADF 21 (Step S1308: N), the CPU 103 displays, on the operation device 114, a warning screen for prompting the test chart to be placed on the platen 212 (Step S1309). This warning screen is, for example, the warning screen illustrated in FIG. 10. The CPU 103 returns to the process of Step S1306 after displaying the warning screen, and determines whether the test chart is placed on the document tray 200. The CPU 103 repeatedly performs the processes of Steps S1306, S1308, and S1309 until the test chart is placed on the platen 212 and the calibration is executed.

As described above, the user may be allowed to select where to place the test chart, and the test chart may be read from where the test chart is placed to perform the calibration. Therefore, the user can be prevented from giving an erroneous instruction on a method of reading the test chart.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-092432, filed May 15, 2019, which is hereby incorporated by reference herein in its entirety.

What is claimed is:

1. An image forming apparatus, comprising:
a feeder including a tray, on which a sheet is to be placed, the feeder being configured to convey the sheet on the tray;
a reader including a platen, on which a sheet is to be placed, the reader being configured to read the sheet on the platen, and to read the sheet conveyed by the feeder;
an image forming unit configured to form a test pattern;
a controller configured to:
control the image forming unit to form the test pattern on a sheet;
control the reader to read the sheet having the test pattern formed thereon; and
control based on a result of reading the sheet having the test pattern formed thereon, a density of an image to be formed by the image forming unit; and
a display,
wherein the controller allows, in a case where a sheet of a first type having the test pattern formed thereon is placed on the platen, a first reading process in which the reader reads the sheet on the platen,
wherein the controller allows, in a case where a sheet of the first type having the test pattern formed thereon is placed on the tray, a second reading process in which the feeder conveys the sheet on the tray so that the reader reads the sheet on the tray,
wherein the controller allows, in a case where a sheet of a second type having the test pattern formed thereon is placed on the platen, the first reading process in which the reader reads the sheet on the platen,
wherein the controller controls the display, in a case where a sheet of the second type having the test pattern formed thereon is placed on the tray, to display a screen for prompting the sheet on the tray to be placed on the platen on the display without allowing the second reading process, and wherein the first type is different from the second type.

2. The image forming apparatus according to claim 1, further comprising a sensor configured to detect whether the sheet is placed on the tray, wherein the controller controls the display to display the screen when, during a period from when the test pattern is formed on the sheet of the second type by the image forming unit to when a command for giving an instruction to read by the reader is received, a result of the detection by the sensor changes from a first state in which the sheet is not placed on the tray to a second state in which the sheet is placed on the tray.

3. The image forming apparatus according to claim 1, wherein the sheet of the first type has a basis weight that is less than a threshold value, and wherein the sheet of the second type has a basis weight that is greater than the threshold value.

4. The image forming apparatus according to claim 1, wherein the controller is configured to acquire user instruction information concerning a type of a sheet on which the test pattern is to be formed.

5. The image forming apparatus according to claim 1, wherein the controller allows the first reading process in a case where a sheet of a third type having the test pattern formed thereon is placed on the platen, wherein the controller allows the second reading process in a case where a sheet of the third type having the test pattern formed thereon is placed on the tray, wherein the controller is configured to control, in a case where the sheet of the first type is to be read in the second reading process, the feeder so that a conveyance speed of the sheet to be conveyed by the feeder becomes a first speed, and wherein the controller is configured to control, in a case where the sheet of the third type is to be read in the second reading process, the feeder so that the conveyance speed of the sheet to be conveyed by the feeder becomes a second speed, which is different from the first speed.

6. The image forming apparatus according to claim 5, wherein the sheet of the first type has a basis weight that is less than a basis weight of the sheet of the third type, and wherein the second speed is slower than the first speed.

7. The image forming apparatus according to claim 1, further comprising a conversion unit configured to convert image data based on a conversion condition, wherein the image forming unit is configured to form an image based on the image data converted by the conversion unit, and wherein the controller controls the density of an image to be formed by the image forming unit by generating the conversion condition based on the result of reading the sheet having the test pattern formed thereon.

8. The image forming apparatus according to claim 1, wherein the feeder is configured to convey the sheet on the tray along a curved conveyance path.

9. An image forming apparatus, comprising:
a feeder including a tray, on which a sheet is to be placed, the feeder being configured to convey the sheet on the tray;
a reader including a platen, on which a sheet is to be placed, the reader being configured to read the sheet on the platen, and to read the sheet conveyed by the feeder;
an image forming unit configured to form a test pattern;
a controller configured to:
control the image forming unit to form the test pattern on a sheet;
control the reader to read the sheet having the test pattern formed thereon; and
control, based on a result of reading the sheet having the test pattern formed thereon, a geometric characteristic of an image to be formed by the image forming unit; and
a display,
wherein the controller allows, in a case where a sheet of a first type having the test pattern formed thereon is placed on the platen, a first reading process in which the reader reads the sheet on the platen,
wherein the controller allows, in a case where a sheet of the first type having the test pattern formed thereon is placed on the tray, a second reading process in which the feeder conveys the sheet on the tray so that the reader reads the sheet on the tray,
wherein the controller allows, in a case where a sheet of a second type having the test pattern formed thereon is placed on the platen, the first reading process in which the reader reads the sheet on the platen,
wherein the controller controls the display, in a case where a sheet of the second type having the test pattern formed thereon is placed on the tray, to display a screen for prompting the sheet on the tray to be placed on the platen on the display without allowing the second reading process, and
wherein the first type is different from the second type.

10. The image forming apparatus according to claim 9, further comprising a sensor configured to detect whether the sheet is placed on the tray,
wherein the controller controls the display to display the screen, when, during a period from when the test pattern is formed on the sheet of the second type by the image forming unit to when a command for giving an instruction to read by the reader is received, a result of the detection by the sensor changes from a first state in which the sheet is not placed on the tray to a second state in which the sheet is placed on the tray.

11. The image forming apparatus according to claim 9, wherein the sheet of the first type has a basis weight that is less than a threshold value, and
wherein the sheet of the second type has a basis weight that is greater than the threshold value.

12. The image forming apparatus according to claim 9, wherein the controller is configured to acquire user instruction information concerning a type of a sheet on which the test pattern is to be formed.

13. The image forming apparatus according to claim 9, wherein the controller allows the first reading process in a case where a sheet of a third type having the test pattern formed thereon is placed on the platen,
wherein the controller allows the second reading process in a case where a sheet of the third type having the test pattern formed thereon is placed on the tray,
wherein the controller is configured to control, in a case where the sheet of the first type is to be read in the second reading process, the feeder so that a conveyance speed of the sheet to be conveyed by the feeder becomes a first speed, and
wherein the controller is configured to control, in a case where the sheet of the third type is to be read in the second reading process, the feeder so that the conveyance speed of the sheet is to be conveyed by the feeder becomes a second speed, which is different from the first speed.

14. The image forming apparatus according to claim 13, wherein the sheet of the first type has a basis weight that is less than a basis weight of the sheet of the third type, and wherein the second speed is slower than the first speed.

15. The image forming apparatus according to claim 9, wherein the feeder is configured to convey the sheet on the tray along a curved conveyance path.

* * * * *